United States Patent [19]
Grigorian et al.

[11] Patent Number: 6,103,403
[45] Date of Patent: Aug. 15, 2000

[54] CLATHRATE STRUCTURE FOR ELECTRONIC AND ELECTRO-OPTIC APPLICATIONS

[75] Inventors: Leonid Grigorian, Lexington; Peter Eklund, Nicholasville; Shaoli Fang, Lexington, all of Ky.

[73] Assignee: University of Kentucky Research Foundation Intellectual Property Development, Lexington, Ky.

[21] Appl. No.: 08/856,750

[22] Filed: May 15, 1997

[51] Int. Cl.[7] .................................................. B32B 9/04
[52] U.S. Cl. .......................... 428/641; 428/446; 428/450
[58] Field of Search ...................... 423/579, 592, 423/641, 344, 324, 325, 348, 326, 332, 334, 700, 713; 428/446, 420, 688, 689, 641, 702; 427/255, 250; 420/578; 502/60, 63, 64; 117/930, 939

[56] References Cited

U.S. PATENT DOCUMENTS

| | | | |
|---|---|---|---|
| 4,886,788 | 12/1989 | Skuballa et al. | 514/58 |
| 4,987,161 | 1/1991 | Yamamoto | 523/102 |
| 4,988,744 | 1/1991 | Yamamoto | 523/102 |
| 5,315,131 | 5/1994 | Kishimoto et al. | 257/57 |
| 5,332,447 | 7/1994 | Winston et al. | 134/7 |
| 5,380,347 | 1/1995 | Winston et al. | 51/293 |
| 5,387,622 | 2/1995 | Yamamoto | 523/102 |
| 5,420,370 | 5/1995 | Sloan, Jr. | 585/15 |
| 5,432,292 | 7/1995 | Sloan, Jr. | 585/15 |
| 5,716,527 | 2/1998 | Deckman et al. | 210/651 |

FOREIGN PATENT DOCUMENTS 44 22 203   3/1996   Germany .

OTHER PUBLICATIONS

Wide-band-gap SI in open fourfold-coordinated clathrate structures, Gary B. Adams, et al., The American Physical Society, vol. 49, No. 12, Mar. 15, 1994-II, p. 8048.

Preparation of Barium-Containing Silicon Clathrate Compound, Shoji Yamanaka, et al., Fullerene Sci. Tech, Mar. 21, 1995.

Sur une Nouvelle Famille de Clathrates Mineraux isotypes des Hydrates de Gas et de Liquides Interpretation des Resultats Obtenus, Christian Cros, et al., Journal of Solid State Chemistry 2, 570–581 (1970), p. 570, (no month).

Clathrate Structure of Silicon $Na_8Si_{46}$ and $Na_xSi_{136}$ (x < 11), Kasper et al. Science, vol. 150, Oct. 7, 1995, pp. 1713–1714.

Superconductivity in the Silicon Clathrate Compound (Na, $Ba)_xSi_{46}$, Hitoshi Kawaji et al., The American Physical society 1995, vol. 74, No. 8 Physical Review Letters, Feb. 20, 1995, p. 1427.

*Primary Examiner*—Deborah Jones
*Assistant Examiner*—Michael LaVilla

[57] ABSTRACT

A method including the steps of (a) depositing a metal layer on a selected portion of a silicon substrate under a first set of predetermined conditions to form an metal silicide layer and an intermediate n-type silicon layer; and (b) exposing the metal silicide layer and the n-type silicon layer to a second set of predetermined conditions to form a silicon clathrate film on the selected portion of the silicon substrate, where the intermediate n-type silicon layer acts to bond the silicon clathrate to the silicon substrate to form a silicon clathrate structure.

5 Claims, 10 Drawing Sheets

| | |
|---|---|
| Si CLATHRATE | ∼18 |
| INTERMEDIATE n-TYPE Si | ∼12 |
| Si SUBSTRATE | ∼10 |

FIG. 4(a)

| | |
|---|---|
| Na | ~16 |
| NaSi | ~14 |
| n-TYPE Si | ~12 |
| Si SUBSTRATE | ~10 |

FIG. 4(b)

| | |
|---|---|
| Si CLATHRATE | ~18 |
| INTERMEDIATE n-TYPE Si | ~12 |
| Si SUBSTRATE | ~10 |

RAMAN SCATTERING SPECTRUM OF $Na_5Si_{136}$ FILM

FIG. 9(a)

| | |
|---|---|
| Na | ~86 |
| NaGe | ~84 |
| n-TYPE Ge | ~82 |
| Ge SUBSTRATE | ~80 |

FIG. 9(b)

| | |
|---|---|
| Ge CLATHRATE | ~88 |
| INTERMEDIATE n-TYPE Ge | ~82 |
| Ge SUBSTRATE | ~80 |

CLATHRATE STRUCTURE FOR ELECTRONIC AND ELECTRO-OPTIC APPLICATIONS

Silicon clathrates (SCs) are a form of silicon, Si, with a novel crystal structure which includes large hollow polyhedral cages covalently connected into a three-dimensional rigid network, as illustrated in FIGS. 1(a) and 1(c). The cages form around an alkali metal atom, A, such as sodium, Na, potassium, K, rubidium Rb, or cesium Cs, present in the structure, so that crystalline compounds with stoichiometry $A_xSi_y$ are formed.

Two classes of silicon clathrates with different crystal structures are known: the first is a metallic "line phase" or fixed stoichiometry compound, for example $Na_8Si_{46}$, illustrated in FIG. 1(c) and the second is a variable alkali metal content system, for example, $Na_xSi_{136}$ (illustrated in FIGS. 1(a) and 1(b)), which is a semiconductor for $0<x<10$ and a metal for $10 \leq x \leq 24$.

Theoretical calculations predict and the inventors own optical measurement data, illustrated in FIG. 2, confirm that semiconducting silicon clathrates exhibit a fundamental semiconducting gap of approximately 1.9 eV, which is a drastic increase over the 1.17 eV for pure silicon. The bands in the photoluminescence (PL) spectra observed in silicon clathrate films are attributed to the radiative electronic transitions from the conduction band and impurity levels to the valence band. The fundamental semiconducting bandgap is identified with the low-wavelength side cut-off energy of the PL band that is approximately 1.9 eV as indicated by the arrow in FIG. 2.

This increase moves the bandgap up from the infrared light region to the visible light region, which is a commercially valuable property.

For electro-optic applications, this means that silicon clathrates can be used to make a visible light emitter (light emitting diode or solid state laser). Silicon clathrates can also absorb visible light and provide an electronic response acting as an optical detector or provide electrical power as a silicon clathrate solar cell, with dramatically enhanced efficiency as compared to conventional silicon. Silicon clathrates can also be utilized in electronic applications as ordinary heterojunction semiconductor devices (a semiconductor-semiconductor junction), as metal contacts on silicon devices, or Schottky barrier devices (a semiconductor-metal junction).

However, one problem with conventional silicon clathrates is that none of the presently known methods of manufacturing silicon clathrates are conducive for the applications described above. The prior art techniques for forming silicon clathrates all begin with silicon powder. The silicon powder is exposed to an excess amount of hot sodium so that the sodium and silicon atoms interact to form an alkali silicide with a Zintl phase structure. The Zintl phase is further decomposed to remove the excess sodium to thereby form a silicon clathrate. The resulting silicon clathrate is a fine powder with thousands of silicon clathrate "cages" forming each particle. In such a form, it is impossible to bond the individual silicon clathrate particles to a silicon wafer, in order to utilize the silicon clathrate in the applications discussed above. The resulting silicon clathrate powder also includes other crystallographic phases and/or pure silicon.

The present invention solves this problem by providing a method of manufacturing a silicon clathrate film, which is bonded to a silicon substrate. This method produces a silicon clathrate layer and an intermediate n-type silicon layer on the silicon substrate. If a large fraction of the clathrate "cages" are empty, the silicon clathrate exhibits semiconductor behavior. If a higher fraction of the clathrate cages are filled with an alkali metal, rare earth metal, or other metal, the silicon clathrate acts like a conductive metal. The intermediate n-type silicon layer also acts as an adhesive layer for adhering the silicon clathrate layer to the silicon substrate.

SUMMARY OF THE INVENTION

The present invention is directed to the growth of silicon clathrate materials as strongly adhering films on selected portions of the substrates made of conventional silicon. The selectably located silicon clathrate films of the present invention are therefore compatible with mature silicon device technology, which at present, is very well developed. The present invention makes it possible to use all the advanced properties of silicon clathrates for various electro-optic and electronic applications, which include forming p-n or Schottky-type junctions with ordinary silicon which is present in the substrate.

The present invention is also directed to the growth of germanium clathrate materials as strongly adhering germanium clathrate films on selected portions of substrates made of conventional germanium.

The method of the present application which grows silicon clathrate films includes a first step of depositing an alkali metal on a selected portion of a silicon substrate to induce a chemical reaction between the silicon substrate and the alkali metal to form a layer of the alkali metal, a layer of Zintl phase alkali metal silicide, and an n-type silicon layer on the silicon substrate. The second step includes vacuum annealing to remove the alkali metal layer and decompose the Zintl phase alkali silicide layer into a silicon clathrate film and an intermediate n-type silicon layer. In the third step, the silicon substrate with the intermediate n-type silicon layer adhered thereto and the silicon clathrate film adhered to the intermediate n-type silicon layer are washed to remove possible unreacted remnants of the alkali metal or alkali metal silicide and then dried. Formation of a silicon clathrate phase on the silicon substrate surface was confirmed by x-ray diffraction and Raman scattering techniques.

The resulting silicon clathrate structure, including the silicon clathrate film and the intermediate n-type silicon layer, is useful as a heterojunction, with the silicon substrate acting as a narrow bandgap semiconductor and the $Na_xSi_{136}$ ($x<10$) silicon clathrate film grown on the surface of the silicon substrate acting as a large bandgap semiconductor. The resulting silicon clathrate structure, including the silicon clathrate film and the intermediate n-type silicon layer, is also useful as a Schottky barrier device with the silicon substrate acting as the semiconductor and the $Na_xSi_{136}$ ($10 \leq x \leq 24$) silicon clathrate film grown on the surface of the silicon substrate acting as the metal.

The silicon clathrate structure of the present invention may also be utilized as an opto-electronic device, a visible light detector or emitter. The silicon clathrate structure of the present invention may also be used as a solar cell with increased efficiency as compared to analogous devices made of conventional silicon. Finally, the silicon clathrate structure can be utilized as an x-ray radiation detector, where the semiconducting $Na_xSi_{136}$ ($x<10$) silicon clathrate coating is a surface finish layer and/or an n-type semiconductor layer.

The method of the present application which grows germanium clathrate films includes a first step of depositing an alkali metal on a selected portion of a germanium substrate to induce a chemical reaction between the germanium substrate and the alkali metal to form a layer of the alkali metal, a layer of Zintl phase alkali metal germanide, and an n-type germanium layer on the germanium substrate. The second step includes vacuum annealing to remove the alkali metal layer and decompose the Zintl phase alkali germanide layer into a germanium clathrate film and an intermediate n-type germanium layer.

BRIEF DESCRIPTION OF THE DRAWINGS

The present invention will become more fully understood from the detailed description given hereinbelow and the accompanying drawings which are given by way of illustration only and thus not limitative of the present invention, wherein:

FIGS. 4(a) and 4(b) illustrate the layers present in the silicon clathrate structure of the present application;

FIGS. 9(a) and 9(b) illustrate the layers present in the germanium clathrate structure of the present application.

Further scope of applicability of the present invention will become apparent from the detailed description given hereinafter. However, it should be understood that the detailed description and specific examples, while indicating preferred embodiments of the invention, are given by way of the illustration only, since various changes and modifications within the spirit and scope of the invention will become apparent to those skilled in the art from this detailed description.

Detailed Description of the Preferred Embodiment

Figure 3A:
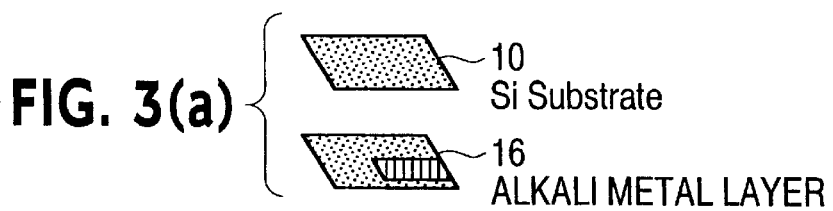
FIGS. 3(a)–3(d) illustrate the steps involved in the selective growth of the silicon clathrate film on a substrate.

The present application is directed to a novel method for making a silicon clathrate structure and also to a novel silicon clathrate structure. In a preferred embodiment of the present invention, an alkali metal 16 (in a preferred embodiment, sodium) is deposited on a selected portion of a surface of a silicon substrate 10, and both the alkali metal 16 and the silicon substrate 10 are heated, which results in a chemical reaction between the silicon substrate 10 and the alkali metal 16, as illustrated in FIG. 3(a). The silicon substrate 10 may be a silicon wafer or a deposited silicon film.

Figure 3B:
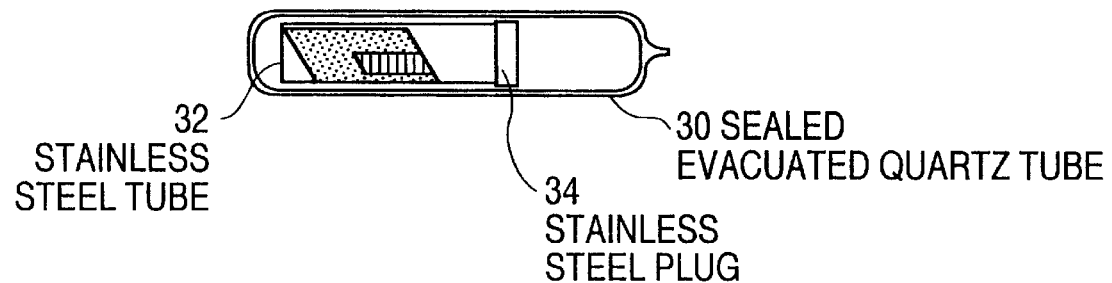

In a preferred embodiment, the molar ratio of the silicon substrate to the alkali metal is 10:1 to 1:1 and is carried out in an inert atmosphere (argon, helium, etc.) or in a vacuum of approximately $10^{-3}$ Torr, inside a sealed, evacuated quartz tube 30 at a temperature of 500° to 600° C. for 0.5 to 5 hours (for sodium). The sealed evacuated quartz tube 30 includes a stainless steel tube 32 and stainless steel plug 34, as illustrated in FIG. 3(b). This results in the formation of a layer of alkali metal silicide (NaSi). The layers present after the first step of the method of the present application are illustrated in FIG. 4(a). The layers include the silicon substrate 10, an n-type silicon layer 12, the Zintl phase alkali metal silicide (NaSi) layer 14, and the alkali metal layer 16. The alkali metal layer 16 may be deposited on the silicon substrate 10 by vacuum deposition or electro-chemical deposition.

Figure 1B:
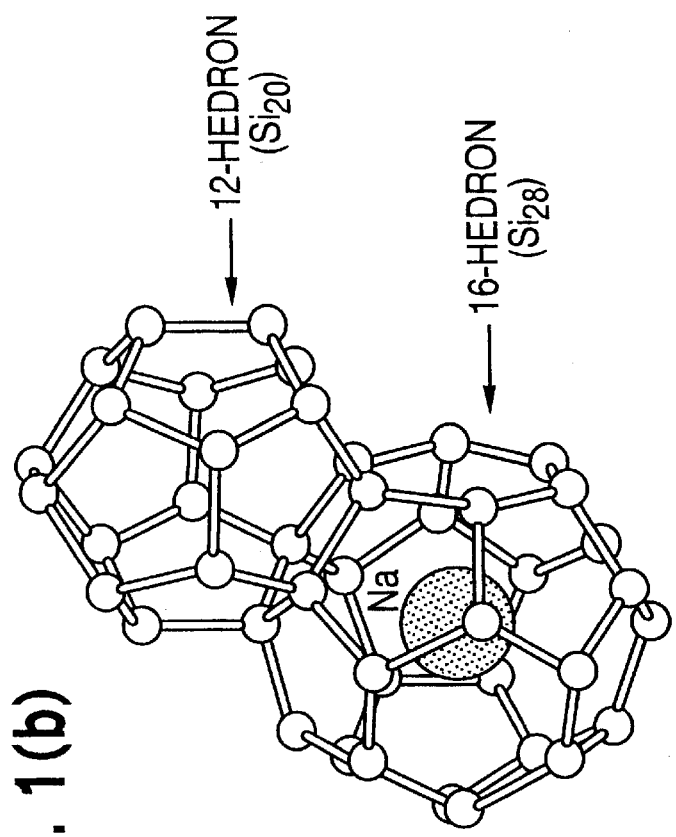
FIG. 1(b) illustrates two types of silicon cages, $Si_{20}$ and $Si_{28}$ (which are building blocks of a $Si_{136}$ structure)
Figure 1A:
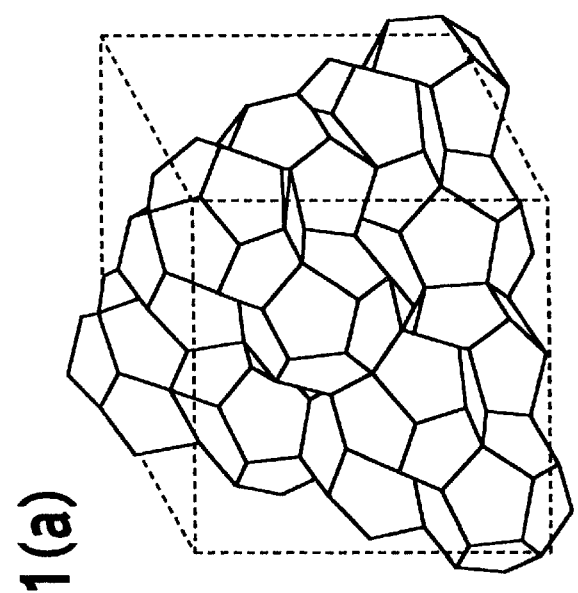
FIG. 1(a) illustrates the structure of a $Na_xSi_{136}$ silicon clathrate.
Figure 1C:
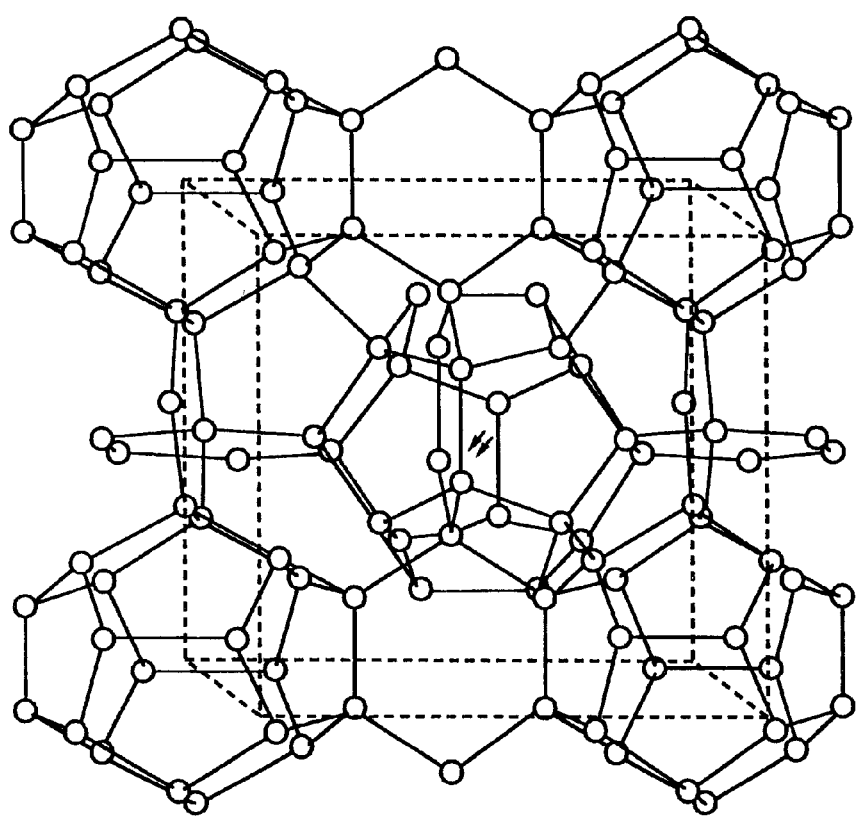
FIG. 1(c) illustrates $Na_8Si_{46}$, a metallic "line phase" or fixed stoichiometry compound.
Figure 2:
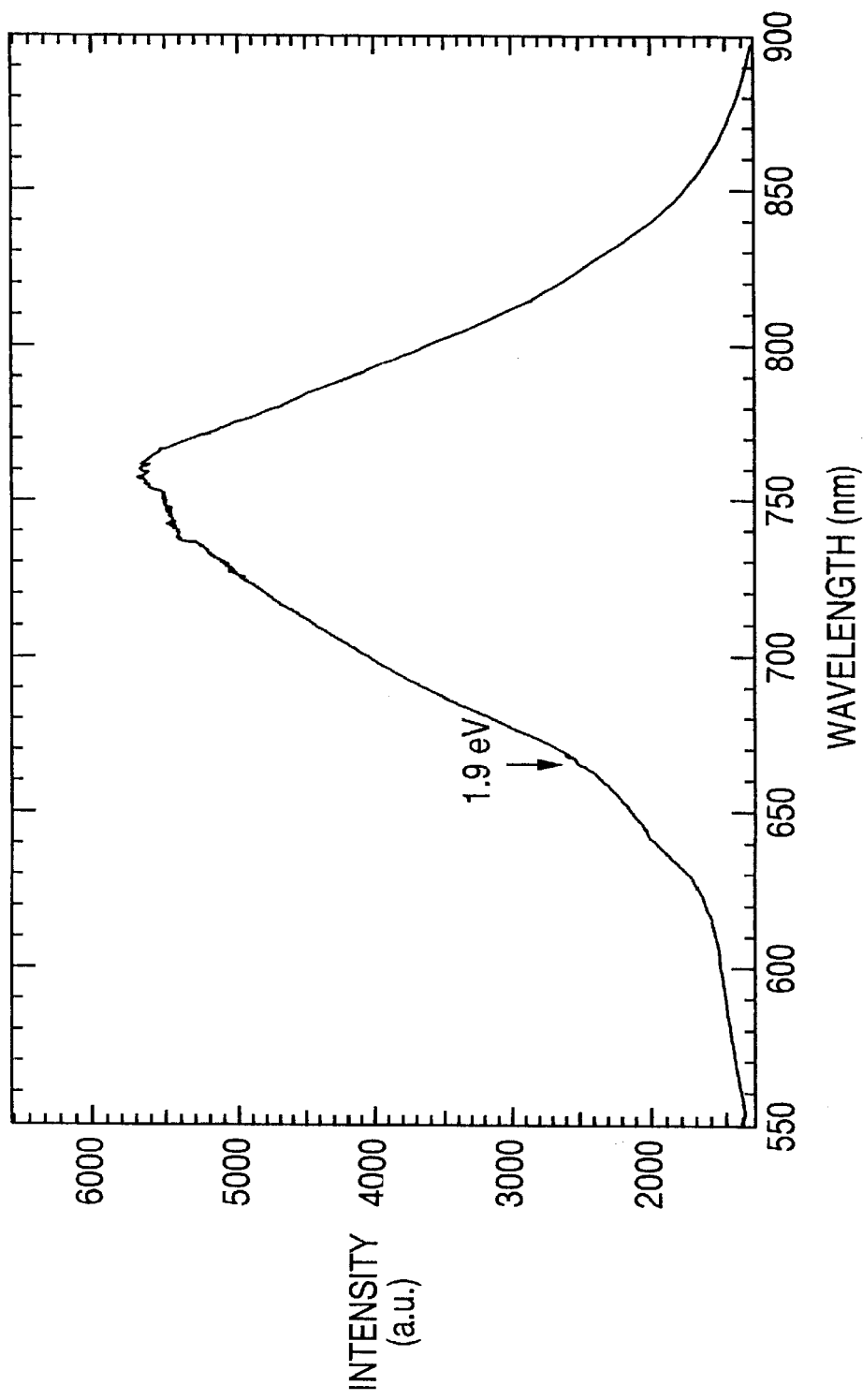
FIG. 2 illustrates the room temperature photoluminescence spectrum of a $Na_5Si_{136}$ film.
Figure 3C:
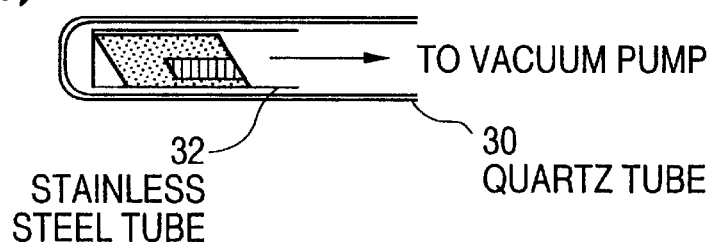
Figure 5:
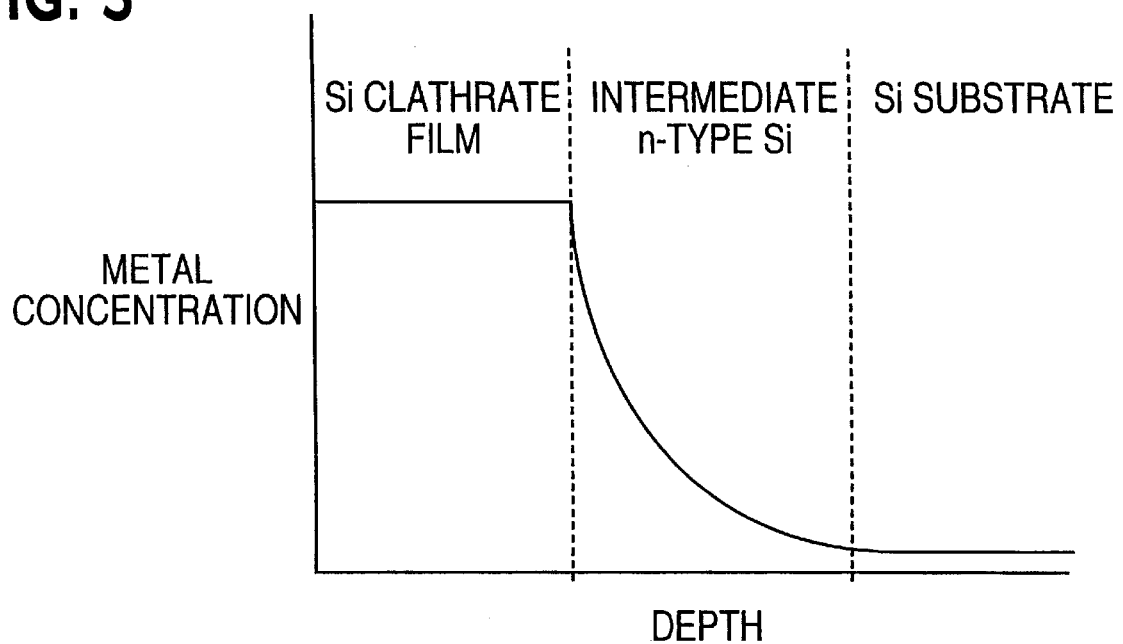
FIG. 5 illustrates the sodium concentration as a function of depth in the silicon clathrate structure of the preferred embodiment.

In the second step of the method of the present invention, in a preferred embodiment, the alkali metal silicide is thermally decomposed (for example by vacuum annealing) in a dynamic vacuum of at least $10^{-3}$ Torr, as illustrated in FIG. 3(c), by heating the alkali metal silicide layer 14 at a temperature of 250° to 450° C. for 3 to 30 hours (in a preferred embodiment for sodium), in order to transform the alkali silicide layer 14 into a silicon clathrate film 18. In the second step, most of the excess alkali metal layer 16 is removed and the alkali silicide layer 14 is decomposed into a silicon clathrate film 18 having the structure illustrated in FIG. 1(a). The layers present after the second step of the method of the present application are illustrated in FIG. 4(b). The layers include the silicon substrate 10, the intermediate n-type silicon layer 12 and the silicon clathrate 18. A graph illustrating the sodium concentration as a function of depth, where depth is measured from the top of the silicon clathrate layer 18 is illustrated in FIG. 5. As illustrated in FIG. 5, the sodium concentration in the silicon clathrate layer 18 is approximately constant and decreases drastically through the intermediate n-type silicon layer 12, until there is virtually no sodium present in the silicon substrate 10.

The decomposition temperature of the alkali metal silicide in the second step controls the type of clathrate structure which is produced. If the decomposition temperature is 320° to 430° C., the resulting $Na_xSi_{136}$ (x<10) silicon clathrate is a semiconductor. As set forth above, this semiconductor is a wide bandgap semiconductor, which is usable for visible opto-electronic applications. Conventional silicon in the diamond structure is an intermediate bandgap, and therefore, is limited only to infrared applications.

If the decomposition temperature is less than 340° C., a metal phase of $Na_xSi_{136}$ (x≧10) is formed and if the decomposition temperature is greater than 410° C., a metal phase of $Na_8Si_{46}$ is formed. If the decomposition temperature is 320° to 340° C. or 410° to 430° C., the resulting silicon clathrate is a mixture of semiconducting and metal phases.

Figure 3D:
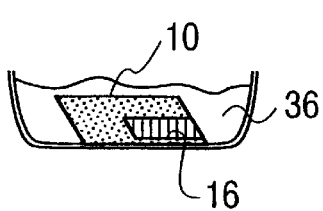
Figure 6:
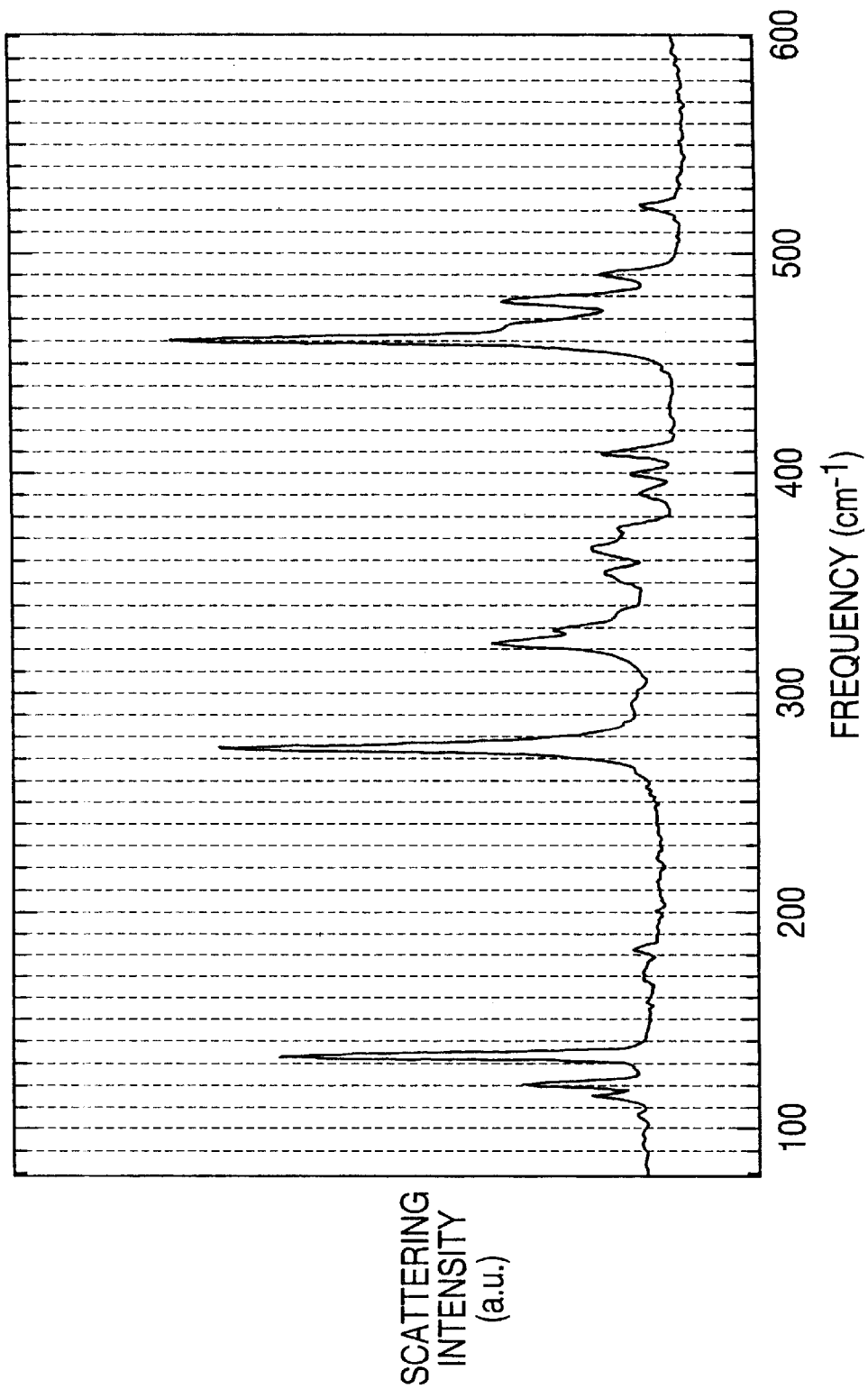
FIG. 6 illustrates the room temperature Raman scattering spectrum of the $Na_5Si_{136}$ film.
Figure 7:
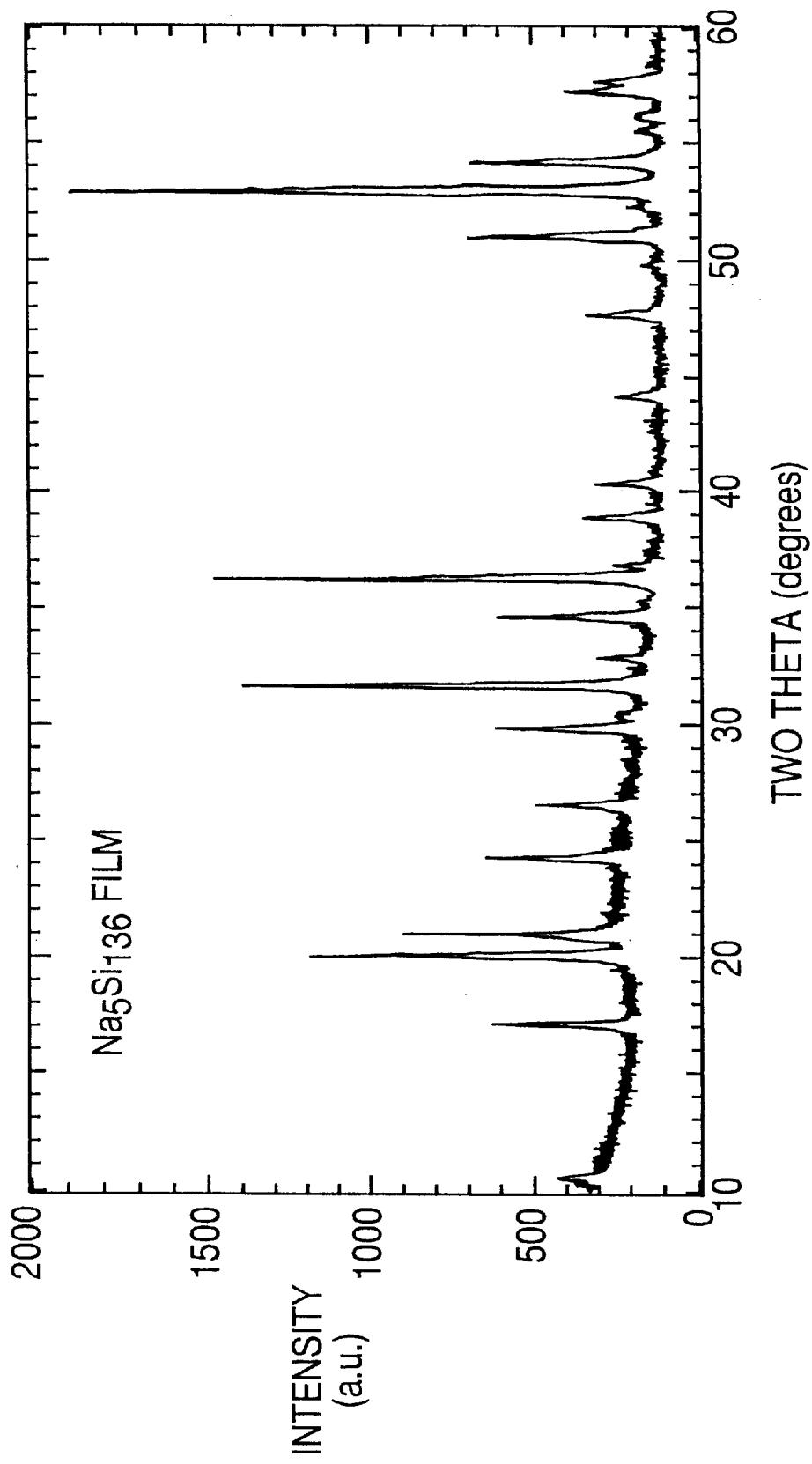
FIG. 7 illustrates the x-ray diffraction pattern of the $Na_5Si_{136}$ film.

In the third step of the method of the present invention as illustrated in FIG. 3(d), the silicon substrate 10 with the silicon clathrate film 18 grown thereon is washed in a distilled water and/or ethanol bath 36 at room temperature for 0.5 to 5 hours in order to remove any possible unreacted remnants of the alkali metal or remnants of the alkali metal silicide. The resulting configuration includes the clathrate layer 18, the intermediate n-type silicon layer 12, and the silicon substrate 10, as illustrated in FIG. 4(b). The formation of the silicon clathrate phase on the silicon substrate 10 is evidenced by x-ray diffraction and Raman scattering techniques, as illustrated in FIGS. 6 and 7.

X-ray powder diffraction spectra are analyzed using a Rietveld structural analysis technique which obtains a complete crystallographic description of samples. The Raman scattering technique is primarily used to study vibrational properties of samples, but it also can be used to detect impurity amounts of other phases, such as diamond-lattice Si which are below the sensitivity range of x-ray diffraction techniques. All the observed x-ray diffraction and Raman lines in FIGS. 6 and 7 are narrow and can be identified with the diffraction pattern and the vibrational modes, respectively, a $Na_5Si_{136}$ film. The data in FIGS. 6 and 7 indicates that the film contains only one crystallographic phase ($Na_5Si_{136}$), and that the sample is highly crystalline.

Although the above embodiment discloses the use of sodium, any other alkali metal could also be used, including potassium, rubidium or cesium. In fact, any element which readily diffuses into a silicon platform, and forms a Zintl phase structure as disclosed above, could be utilized as the dopant. This would also include other metals such as rare earth metals and magnetic metals.

In summary, the main difference between the method disclosed in the present application for making a silicon clathrate structure and prior art methods are (1) the direct contact of the alkali metal with the silicon substrate; and (2) the area selectivity of the reaction in only those regions where the alkali metal makes direct contact with the silicon substrate. Due to the extremely high alkali metal concentration at the area in direct contact with the silicon substrate, as compared with the entire silicon surface area, a relatively lower reaction temperature and shorter reaction time is needed, in order to form the Zintl phase alkali metal silicide of the present invention. The other unreacted areas on the silicon substrate can be treated using traditional silicon technology to create electronic components on the same substrate, thereby for the first time integrating both optical and electronic elements in a single silicon chip. This will allow faster transfer of optical-based information to the processing electronics, reduce cross-talk, and reduce propagation delay.

As a result, four important advantages of growing silicon clathrates as a film on a selected portion of a silicon substrate are:

1. the integration of optical and electronic elements on a single silicon chip;
2. flat smooth optical surfaces on the silicon clathrate region for emission and detection of light;
3. higher crystalline quality of the samples obtained, as indicated by narrow x-ray diffraction and Raman scattering lines; and
4. the ability to obtain crystallographic phases free of impurities.

Additionally, the silicon clathrate layer and resulting silicon clathrate structure disclosed in the present invention are chemically very inert and stable at ambient conditions (as much as pure silicon) and therefore, their properties are easy to reproduce and control, in contrast with porous silicon, whose properties are very difficult to control, whose films are not sufficiently smooth, and which are very sensitive to ambient conditions, which preclude their practical application.

Figure 8A:
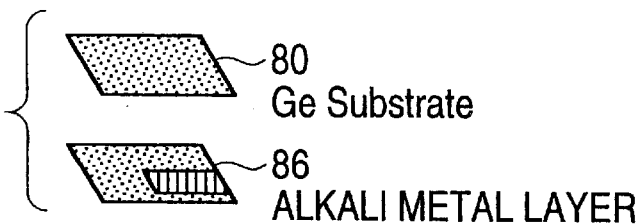
FIGS. 8(a)–8(d) illustrate the steps involved in the selective growth of a germanium clathrate film on a substrate.
Figure 8B:
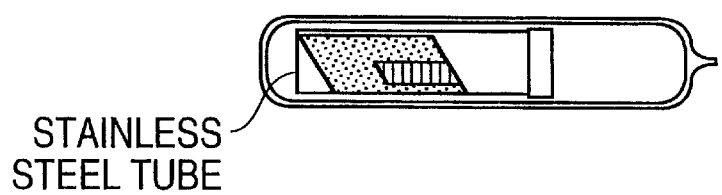

In another preferred embodiment, the present application is directed to a novel method for making a germanium clathrate structure and also to a novel germanium clathrate structure. In a preferred embodiment of the present invention, an alkali metal (in the present description, sodium) is deposited on a selected portion of a surface of a germanium substrate 80, and both the alkali metal and the germanium substrate 80 are heated, which results in a chemical reaction between the germanium substrate 80 and the alkali metal layer 86, as illustrated in FIG. 8(a). The germanium substrate 80 may be a germanium wafer or a deposited germanium film. In a preferred embodiment, the germanium substrate 80 and the alkali metal layer 86 are sealed inside a stainless steel tube 92 under an inert atmosphere (for example argon gas), as illustrated in FIG. 8(b). The sealed stainless steel 92 with the sample is heated in a vacuum of 0.1 to $10^{-3}$ Torr at a temperature of 300° to 400° C. for 1 to 30 hours (the values for one preferred embodiment using sodium) to form a sodium germanide, NaGe. The layers present after the first step of the method of the present application are illustrated in FIG. 9(a). The layers include the germanium substrate 80, an n-type germanium layer 82, a an alkali metal germanide (NaGe) layer 84, and a layer of alkali metal 86. The alkali metal 86 may be deposited on the germanium substrate 80 by vacuum deposition or electrochemical deposition.

Figure 8C:
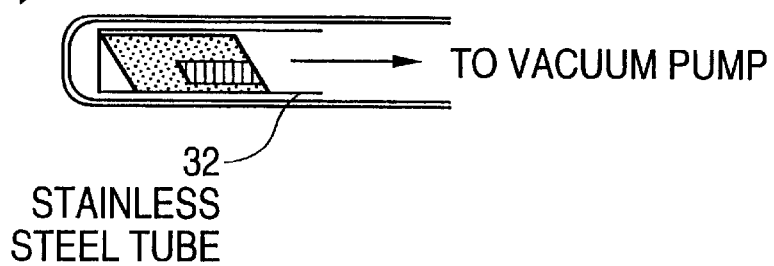

In the second step of the method of the present invention, in a preferred embodiment, the alkali metal germanide is thermally decomposed (for example by vacuum annealing) in a dynamic vacuum of at least $10^{-3}$ Torr, as illustrated in FIG. 8(c), by heating the alkali metal germanide at a temperature of 200° to 350° C. for 1 to 30 hours (in a preferred embodiment for sodium), in order to transform the alkali germanide layer 84 into a germanium clathrate film 88. In the second step, most of the excess alkali metal layer 86 is removed and the alkali germanide layer 84 is decomposed into a germanium clathrate film 88. The layers present after the second step of the method of the present application are illustrated in FIG. 9(b). The layers include the germanium substrate 80, the intermediate n-type germanium layer 82 and the germanium clathrate 88.

Figure 8D:
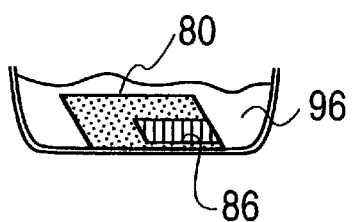

In the third step of the method of the present invention as illustrated in FIG. 8(d), the germanium substrate 80 with the germanium clathrate film 88 grown thereon is washed in a distilled water and/or ethanol bath 96 in order to remove any possible unreacted remnants of the alkali metal or remnants of the alkali metal germanide. The resulting configuration includes the germanium clathrate layer 88, the intermediate n-type germanide layer 82, and the germanium substrate 80, as illustrated in FIG. 9(b).

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed:

1. A silicon clathrate structure, comprising:

a silicon substrate;

a silicon clathrate film on a selected portion of said silicon substrate; and an intermediate n-type silicon layer, bonding said silicon clathrate to said silicon substrate.

2. The silicon clathrate structure of claim 1, wherein said silicon clathrate film includes an alkali metal.

3. The silicon clathrate structure of claim 2, wherein the alkali metal is sodium.

4. The silicon clathrate structure of claim 1, wherein said silicon clathrate film includes a rare earth metal.

5. The silicon clathrate structure of claim 1, wherein said silicon clathrate film includes a metal.

* * * * *